H. & J. HARRINGTON.
Portable Fence.
No. 202,722. Patented April 23, 1878.
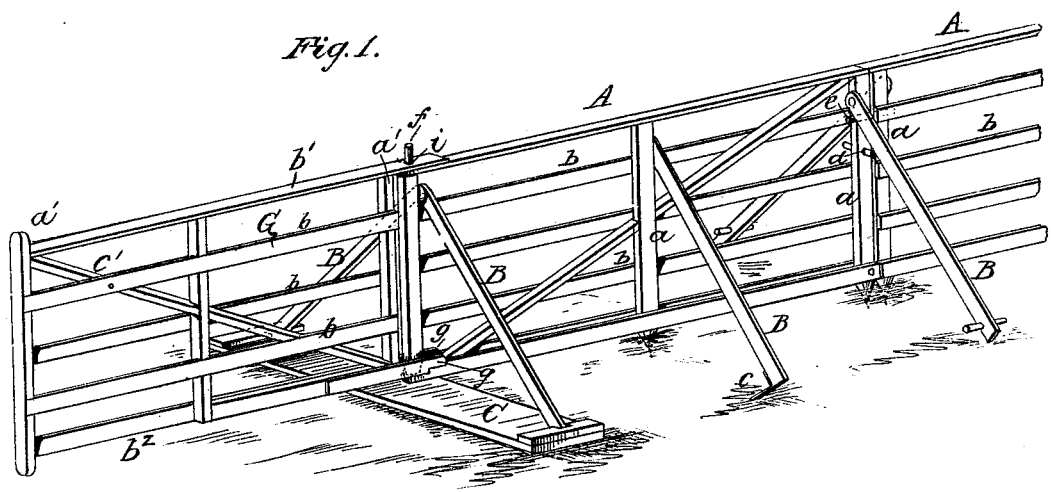
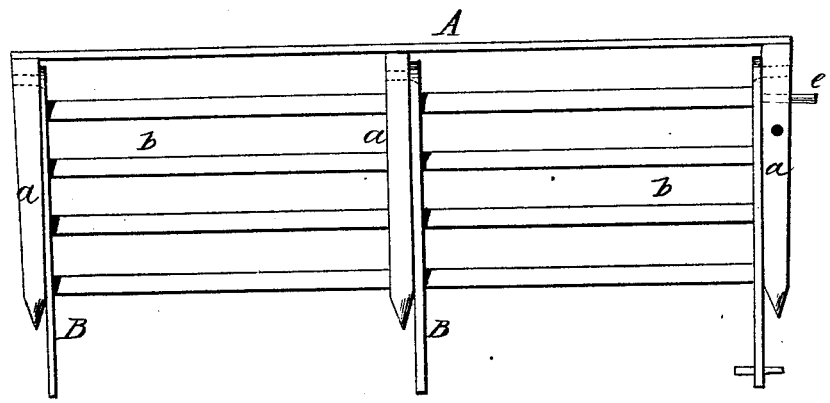
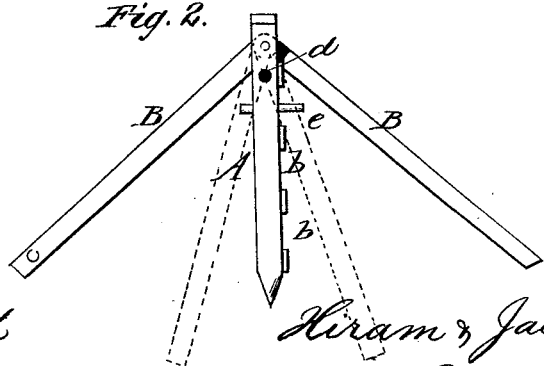
Witnesses
Fred G. Dieterich
Jno. P. Brooks
Inventors
Hiram & Jacob Harrington
by C. A. Snow & Co.
Attorneys.

UNITED STATES PATENT OFFICE.

HIRAM HARRINGTON AND JACOB HARRINGTON, OF WOODSTOCK, ONTARIO, CANADA.

IMPROVEMENT IN PORTABLE FENCES.

Specification forming part of Letters Patent No. 202,722, dated April 23, 1878; application filed March 22, 1878.

*To all whom it may concern:*

Be it known that we, HIRAM HARRINGTON and JACOB HARRINGTON, of Woodstock, in the Province of Ontario and Dominion of Canada, have invented certain new and useful Improvements in Portable Fences; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved fence. Fig. 2 is an end view of one of the sections; and Fig. 3 is a side view.

Similar letters of reference denote corresponding parts in all the figures.

This invention relates to an improved portable fence and the gate used in combination therewith, as we shall now proceed more fully to describe with reference to the drawings, in which—

A A are the sections or panels of which the fence is composed. Each consists of posts $a\ a$, the lower ends of which are pointed, so as to enter the ground readily by the weight of the fence. The posts $a$ are connected by longitudinal rails $b\ b$, the lower ones of which are somewhat shorter than the upper ones, as will appear by reference to Fig. 3 of the drawings, thus adapting the fence to uneven as well as to even ground. To the inside of posts $a\ a$, at their upper ends, are pivoted braces B B, having hooked ends $c\ c$, which, by catching in the soil, support the panels when placed in position.

The end posts of the panels have perforations $d\ d$. In erecting the fence the panels are placed end to end in such a manner that the braces or supports of alternate panels shall come on opposite sides. A key, $e$, is then driven through the perforations in the end posts, thus securing the panels together and causing the fence to remain firmly in position.

The gate G consists of posts $a'\ a'$ having longitudinal rails $b^1\ b^2$ and cross-brace $c'$. The top rail $b^1$ projects beyond the end post $a'$, and forms an ear having a perforation, $i$, which fits over an upwardly-projecting pin, $f$, upon the end post of the panel to which the gate is to be hinged. From the bottom rail of the gate two projections, $g\ g$, extend sufficiently to catch around the end post of the last panel, upon which the gate is thus made to swing. In order to support the gate more firmly, the post upon which it is hinged should be provided with a brace, B, on each side; and the ends of these, instead of entering the ground, may be mortised in a plank, C, placed upon the ground, as in Fig. 1. The post $a$ may also be mortised into the said plank C.

Our improved fence is cheap and durable, and it may be put up or taken down at very short notice.

Having thus described our invention, we claim and desire to secure by Letters Patent of the United States—

The combination, with a portable fence, constructed substantially as herein described, of the gate G, having perforated projection $b^1$ and catches $g\ g$, and the plank C, all constructed, arranged, and operating substantially as described, for the purpose herein shown and specified.

In testimony that we claim the foregoing as our own we have hereto affixed our signatures in presence of two witnesses.

HIRAM HARRINGTON.
JACOB HARRINGTON.

Witnesses:
W. S. DAUGHTREE,
WARREN TOTTEN.